United States Patent Office 3,056,829

Patented Oct. 2, 1962

3,056,829

PROCESS FOR MAKING ITACONIC ACID ESTERS

Giuseppe Messina, Limbiate, Nicola de Pisapia, Milan, Levio Spano, Cesano Maderno, and Emanuele Condorelli, Milan, Italy, assignors to L.I.R.C. Laboratori Italiani di Ricerca Chimica, Milan, Italy, a joint-stock company of Italy No Drawing. Filed Nov. 17, 1959, Ser. No. 853,467
Claims priority, application Italy Oct. 29, 1959
7 Claims. (Cl. 260—485)

This invention relates to a process for the esterification of itaconic acid, which can be applied both to pure itaconic acid and to raw itaconic acid.

It is known to esterify itaconic acid with an excess of methyl alcohol in the presence of sulphuric acid as a catalyst. In the course of the reaction, methyl diester and methyl monoester are formed, and said two esters can then be separated by distillation.

However, losses of the monoester are incurred when the sulphuric acid present in the reaction product is neutralized, since a significant portion of the monoester is also neutralized in this operation, and then dissolved in the form of a salt in the neutralization water.

However the neutralization of the catalyst cannot be wholly avoided because otherwise a decomposition of the formed esters would take place in the distillation, with a consequent decrease of the final yield.

It is an object of the invention to avoid the loss of monoester without adversely affecting the neutralization or yield. This object is effected according to the invention if the sulphuric acid which is used as a catalyst is neutralized only until the pH of the reaction product is brought within a critical, narrow range of 2.5–3.5, and preferably of 2.8–3.1. At said pH, the conversion of the monoester into a salt is sufficiently small, so that the monoester can be recovered by distillation or re-cycled, and at the same time, no ester decomposition and decrease of yield is apparent. Many advantages can be obtained by the improvement according to this invention. Thus, the esterification process is simplified, and higher yields (e.g. more than 94 pct. as contrasted to 87–88 pct.) formerly are obtained. Furthermore, the monoester can be wholly recovered by distillation or completely re-cycled without distillation, so that the only final reaction product is the methyl diester of itaconic acid.

The esterification is carried out in the already well known manner, at temperatures in the range of 65°–80° C., and preferably of 65°–70° C. Reducing agents such as butylcatechol or quinones, and particularly hydroquinone, are added in the esterification, to inhibit polymerisation during the esterification step.

The amount of sulphuric acid used is preferably from 4 to 8 pct. by weight of the initial itaconic acid.

The esterification is followed by neutralization, distillation of methanol, washing of the esterification product with a 3 pct. solution of sodium sulphate to remove the sodium sulphate and bisulphate formed in the neutralization and the last residues of sulphuric acid, and finally, by vacuum distillation of the esterification products.

The above process can be applied both to pure as well as to raw itaconic acid; however, in the latter case, it is preferable to filter the reaction product immediately after the esterification step.

The invention will be more clearly understood from the following examples. All percentages in this specification are by weight.

*Example 1*

A mixture of 910 g. (7 mols) of pure itaconic acid, 1120 g. (35 mols) of methanol, 68 g. (7.5 pct. of the initial itaconic acid) of 98 pct. sulphuric acid, and 1 g. (1/1000 of the initial itaconic acid) of hydroquinone is esterified. The esterification lasts about 10 hrs. at the methanol reflux temperature (about 65° C.). After esterification, the resulting reaction product is neutralized (under the control of a potentiometer) to a pH of 2.9, by means of 30 g. of sodium hydroxide added as 33 pct. sodium hydroxide solution.

The neutralized reaction product is distilled, under atmospheric pressure, at a maximum temperature in the interior of the mass of 80° C., thereby recovering 360 g. of aqueous methanol (density 0.83). The distillation is then continued at reduced pressure (max. 300 mm. Hg), and an additional amount of 290 g. of methanol (density 0.84) is recovered in this latter phase.

The distillation residues are washed with 500 ml. of a 33 pct. solution of sodium sulphate, whereupon an upper layer of diester and monoester solution is separated from a bottom layer consisting of a concentrated solution of sodium sulphate.

The esterification products thus separated are then submitted to a vacuum distillation (20–30 mm. Hg) which, when performed in an efficient rectification column, separates the methyl diester from the monoester. A head fraction consisting of 90 g. of water and small quantities of methanol, is firstly obtained.

A first fraction, consisting of 820 g. of pure diester (max. acidity 6.0) distills in the range of 95°–98° C. Then a second fraction, consisting of 205 g. of monoester, distills in the range of 140°–145° C. 10 g. of tails, consisting of resinous products and non-volatile impurities, are finally left.

The diester yield is of 73.5 pct., and the monoester yield is of 20.3 pct., so that the total yield is 93.8 pct. of a theoretical amount.

*Example 2*

910 g. of raw itaconic acid, 1120 g. of methanol, 68 g. of sulphuric acid, 1 g. of hydroquinone are processed as in Example 1. After the esterification the solution is filtered, whereby 40 g. of residues are filtered out. The solution is then neutralized to a pH of 2.9–3 by the addition of 27 g. of sodium hydroxide added as 33 pct. sodium hydroxide solution. Next, by a distillation under atmospheric pressure and at a max. temperature of 80° C., 350 g. of methanol (density 0.832) are recovered, and a further 300 g. of methanol (density 0.84) are recovered by distillation at a reduced pressure (maximum 300 mm. Hg).

The product is then washed with a sodium sulphate solution, as in Example 1, and after separation of layers, the esterification products are distilled, thereby obtaining:

100 g. of head products, first fraction 745 g. of diester, second fraction 197 g. of monoester, 30 g. of tail products.

The diester yield is 73.2 pct.; the monoester yield is 20.9 pct.; the overall yield is 94.1 pct.

What we claim is:

1. A process for obtaining the methyl esters of itaconic acid comprising esterifying itaconic acid with methyl alcohol in the presence of sulphuric acid as a catalyst to form methyl monoester and methyl diester, and neutralizing the acidity of the reaction product of the esterification to a pH value between about 2.5 and 3.5 to minimize loss of the monoester and prevent ester decomposition.

2. A process according to claim 1, wherein the pH is between about 2.8 and 3.1.

3. A process according to claim 1 further comprising distilling the neutralized reaction product to separate methanol, washing the esterification products with a sodium sulphate solution to obtain a solution of methyl monoester and methyl diester and substantially separating the monoester and diester by vacuum distillation.

4. A process according to claim 1, wherein raw itaconic acid is used as starting product, and the reaction product as obtained from the esterification, is purified by filtering.

5. A process according to claim 1, wherein amounts of sulphuric acid ranging between 4 and 8 pct. by weight of the initial itaconic acid, are used in the esterification.

6. A process according to claim 1, wherein the esterification is carried out at temperatures in the range of 65°–80° C.

7. A process according to claim 1, further comprising distilling the neutralized reaction product to separate firstly the methanol and subsequently the monomethyl and dimethyl esters from one another.

References Cited in the file of this patent

UNITED STATES PATENTS

| | | |
|---|---|---|
| 2,237,729 | Evans et al. | Apr. 8, 1941 |
| 2,699,436 | D'Alelio | Jan. 11, 1955 |
| 2,766,273 | Bruins et al. | Oct. 9, 1956 |

FOREIGN PATENTS

| | | |
|---|---|---|
| 410,385 | Great Britain | May 17, 1934 |

OTHER REFERENCES

Stafford et al.: "Analytical Chemistry," vol. 26, No. 4, April 1954, pp. 656–661.

Satta et al.: "Journal of the American Chemical Society," vol. 75, p. 4101 (1953).